US012559234B2

(12) United States Patent
Taghizad

(10) Patent No.: US 12,559,234 B2
(45) Date of Patent: Feb. 24, 2026

(54) VERTICAL TAKE-OFF AND LANDING AIRCRAFT

(71) Applicant: OFFICE NATIONAL D'ETUDES ET DE RECHERCHES AÉROSPATIALES, Palaiseau (FR)

(72) Inventor: Armin Taghizad, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 0 days.

(21) Appl. No.: 19/118,438

(22) PCT Filed: Oct. 4, 2023

(86) PCT No.: PCT/EP2023/077418
§ 371 (c)(1),
(2) Date: Jun. 25, 2025

(87) PCT Pub. No.: WO2024/074543
PCT Pub. Date: Apr. 11, 2024

(65) Prior Publication Data
US 2025/0388318 A1      Dec. 25, 2025

(30) Foreign Application Priority Data

Oct. 6, 2022     (FR) ...................................... 2210254

(51) Int. Cl.
B64C 3/56          (2006.01)
B64C 3/54          (2006.01)
B64C 29/00         (2006.01)
(52) U.S. Cl.
CPC .......... B64C 29/0033 (2013.01); B64C 3/546 (2013.01); B64C 3/56 (2013.01)

(58) Field of Classification Search
CPC .. B64C 3/54; B64C 3/546; B64C 3/56; B64C 29/00; B64C 29/0008; B64C 29/0016;
(Continued)

(56) References Cited

U.S. PATENT DOCUMENTS 10,029,785 B2 *  7/2018  Niedzballa ............. B64U 20/70
12,006,033 B1 *  6/2024  Villa ...................... B64U 50/19
(Continued)

FOREIGN PATENT DOCUMENTS

DE        102014000509 A1 *  7/2015  ............. B64D 27/31
DE        102020007834 A1       6/2022
(Continued)

OTHER PUBLICATIONS

International Search Report and Written Opinion issued in corresponding International Application No. PCT/EP2023/077418, mailed Dec. 21, 2023, European Patent Office, Rijswijk, Netherlands, pp. 1-8.
(Continued)

*Primary Examiner* — Joshua E Rodden
(74) *Attorney, Agent, or Firm* — HAUPTMAN HAM, LLP

(57)            ABSTRACT
A vertical take-off and landing aircraft includes a fuselage, at least one propulsion system, at least four lift propellers and at least two fixed wing planes. The fixed wing planes which are located behind the most forward lift propellers are located above the lift propellers. The lift propellers are distributed on either side of at least one of the fixed wing planes and on either side of the fuselage such that the lift propellers are longitudinally separated by at least the magnitude of the chord of the fixed wing plane located therebetween, and are laterally separated by at least the width of the fuselage located therebetween. At least one of the fixed wing
(Continued)

planes has a variable span and the aircraft includes a control system for varying this span in flight.

7 Claims, 3 Drawing Sheets

(58) Field of Classification Search
CPC ............ B64C 29/0025; B64C 29/0033; B64C 29/0041; B64C 29/05; B64C 29/0058; B64C 29/0075; B64C 29/0083; B64C 29/0091; B64C 29/02; B64C 29/04; B64C 2003/543
USPC .......................................................... 244/6
See application file for complete search history.

(56) References Cited

U.S. PATENT DOCUMENTS

| | | | | |
|---|---|---|---|---|
| 12,397,911 | B2 * | 8/2025 | Peck ....................... | B64C 27/32 |
| 2016/0236775 | A1 * | 8/2016 | Eshkenazy .......... | B64C 29/0025 |
| 2017/0240273 | A1 * | 8/2017 | Yuen ................... | B64C 29/0033 |
| 2019/0337613 | A1 * | 11/2019 | Villa ...................... | B64C 23/00 |
| 2020/0333779 | A1 | 10/2020 | Regev | |
| 2021/0129985 | A1 | 5/2021 | Regev | |
| 2021/0362849 | A1 | 11/2021 | Bower et al. | |
| 2024/0101251 | A1 * | 3/2024 | Tian .......................... | B64C 3/56 |

FOREIGN PATENT DOCUMENTS

| | | | | |
|---|---|---|---|---|
| EP | | 3736213 A1 | 11/2020 | |
| WO | WO-2013056493 A1 * | 4/2013 | ............. | B64D 27/34 |

OTHER PUBLICATIONS

An Official letter issued on Nov. 22, 2025, by the Patent Office of China (1st page attached).

* cited by examiner

[Fig 1]
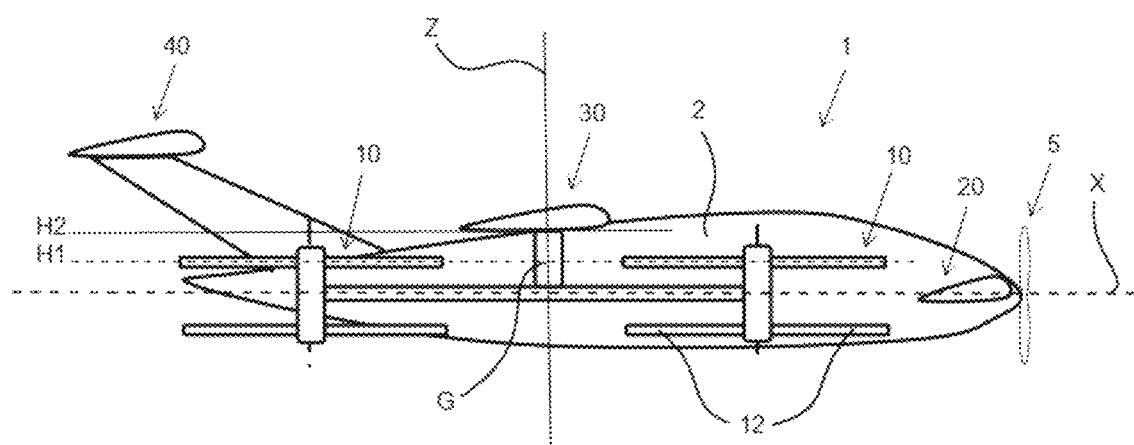

[Fig 2]
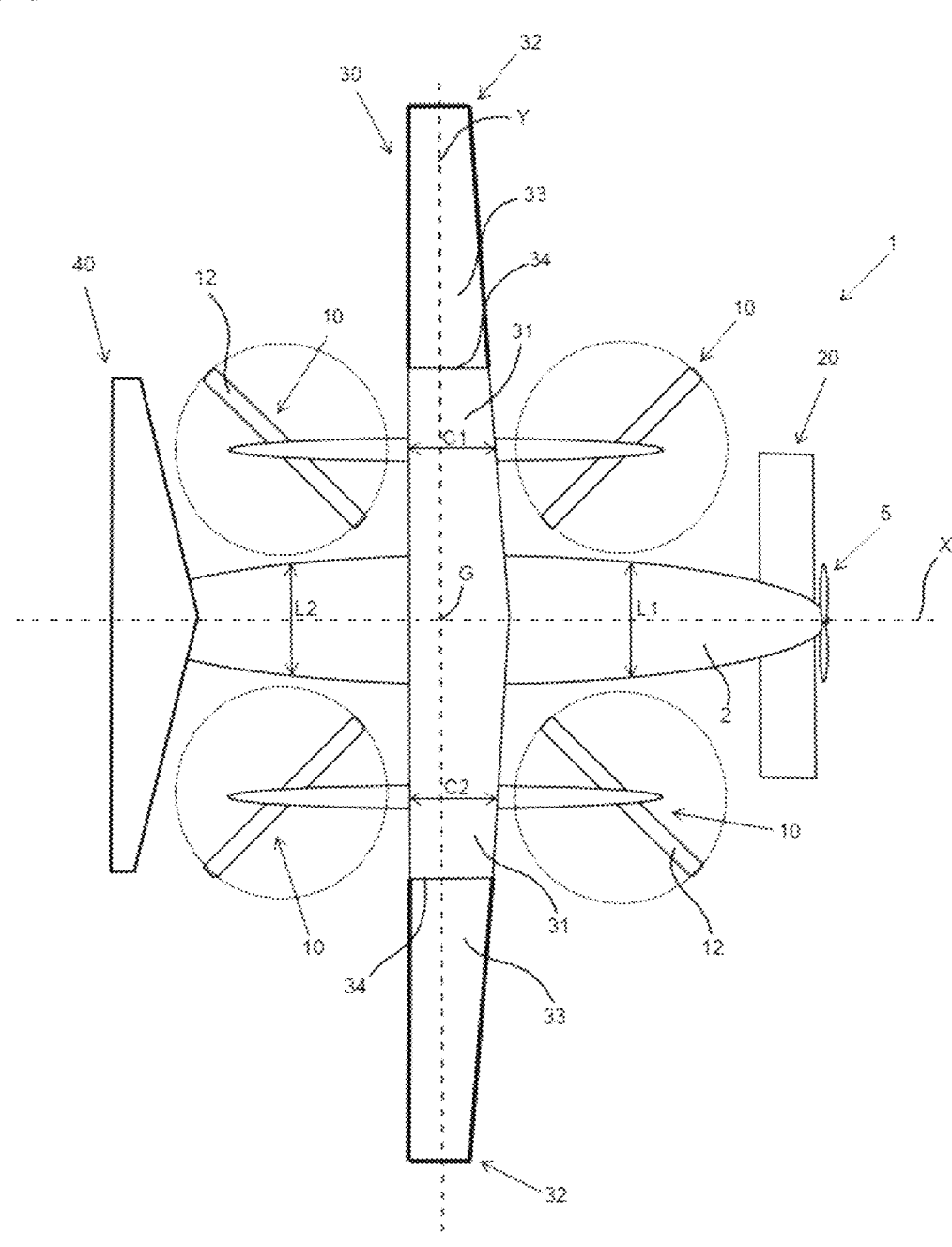

[Fig 3]
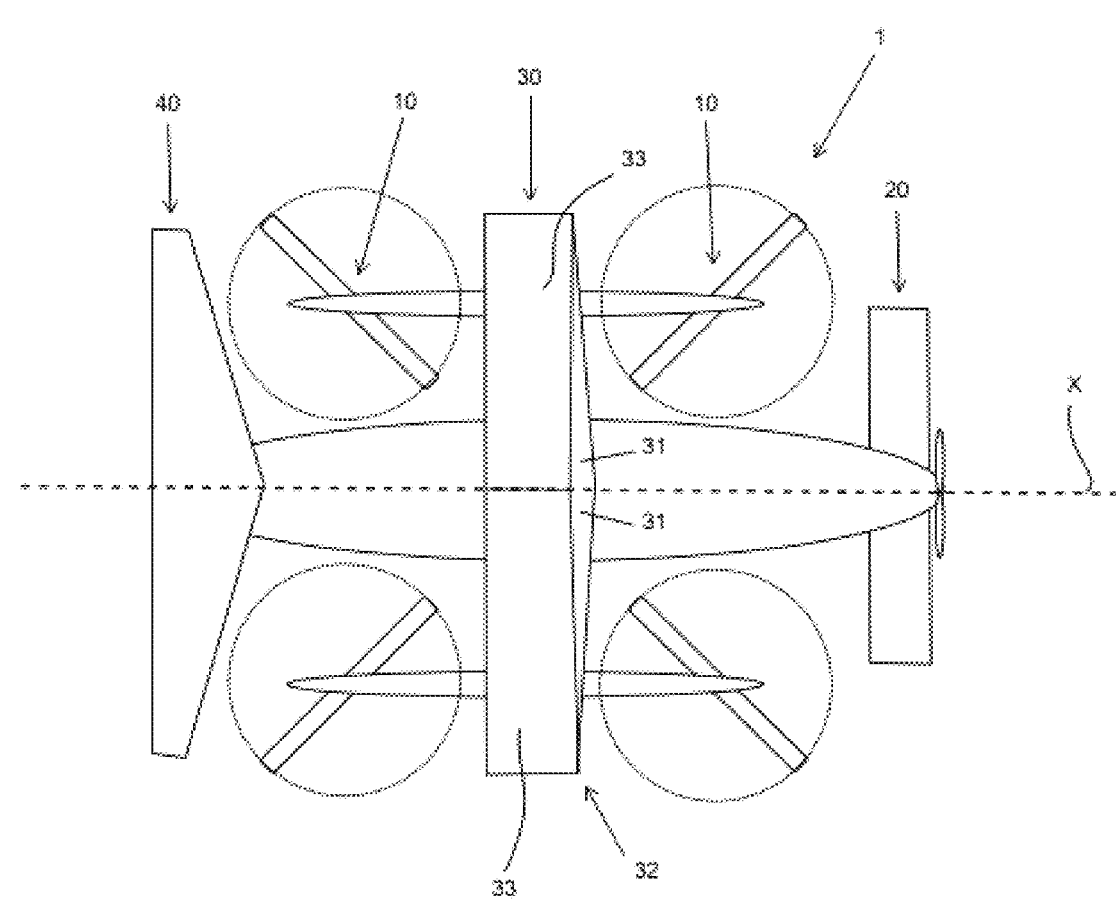

VERTICAL TAKE-OFF AND LANDING AIRCRAFT

CROSS-REFERENCE TO RELATED APPLICATIONS

The present application is a U.S. National Phase of International Application Number PCT/EP2023/077418, filed Oct. 4, 2023, which claims priority to French Application No. 2210254, filed Oct. 6, 2022.

TECHNICAL FIELD

The invention relates to a Vertical Take-Off and Landing aircraft or 'VTOL' aircraft. More particularly, the invention relates to a variable-span VTOL aircraft.

BACKGROUND

Numerous VTOL aircraft configurations have been studied in the past, often with the aim of avoiding degradation of the intrinsic aerodynamics of the aircraft. Indeed, this kind of apparatus often has the feature of having, further to the fixed wing planes for lifting in forward flight, a number of propellers that ensure lift of the apparatus during take-off and vertical landing. The propulsion function, meanwhile, can be provided by the same propellers if they have been designed to be pivotable, or by other devices such as fans, turbojets or any other device capable of producing thrust.

The simultaneous use of fixed wing planes and propellers on a same VTOL aircraft necessarily lead to the appearance of aerodynamic interaction phenomena between wakes of these members (propeller/fixed wing plane wakes, propeller/propeller wakes, fixed wing plane/fixed wing plane wakes). These interactions often have an impact on the aerodynamic performance of the aircraft and, consequently, on its flight qualities and mission performance.

This phenomenon is amplified when the aircraft is provided with electric motor propellers. Indeed, as compared with other types of motors or engines, for a same take-off power sought, it is necessary to increase number of electric motors, and therefore propellers, for lifting. Moreover, flight safety requirements generally lead to an increase in the number of propellers to compensate for electric motor failure. This increase in the number of propellers accentuates the interaction phenomena and their consequences on the aircraft performance. Moreover, this high number of propellers requires adapted fixed wing planes for take-off and landing and, in the end, leads to relatively large aircraft length and width dimensions. This lack of compactness means that the aircraft cannot take off or land in confined areas, such as forests (clearings, wooded areas) or urban zones.

Finally, limiting the weight of VTOL aircraft is a constant concern.

There is therefore a need for a new type of VTOL aircraft that is more compact, relatively light and wherein aerodynamic interactions would be decreased.

General Description

A vertical take-off and landing aircraft according to the invention comprises a fuselage, at least one propulsion system, four lift propellers and at least two fixed wing planes, including a main wing plane and a rear wing plane located behind the aircraft. The main wing plane and the rear wing plane are both located behind the most forward lift wing plane, and both are located above the lift propellers. The main plane has a variable span and comprises a pair of wings, each wing being foldable along the lateral axis of the aircraft, such that a movable end part of the wing is positioned along and above a fixed part of the wing upon folding. The aircraft comprises a control system for varying the span of the main plane in flight by unfolding each wing laterally. The four lift propellers are distributed on either side of the main plane and on either side of the fuselage so that:

the two lift propellers located on a same side of the fuselage are connected to the fixed part of the wing located on the same side of the fuselage and are longitudinally separated by at least the magnitude of the chord of the fixed wing plane located therebetween, and the two lift propellers located on a same side of the main plane are laterally separated by at least the width of the fuselage located therebetween.

Such an aircraft has an architecture for reducing effects of aerodynamic interaction between the lift propellers and the fixed wing planes. Indeed, the relative position of the fixed wing planes and the lift propellers is defined so that the wake of all the propellers has a negligible impact on aerodynamics of the fixed wing planes located downstream of these propellers. Likewise, folding of the movable end part of each wing above the fixed part of the wing reduces effects of aerodynamic interaction with the propellers upon folding.

Further, the variable span of the main plane reduces the lateral overall size of this wing plane, and therefore makes the aircraft more compact in the vertical take-off and landing phases.

Finally, the fixed part of each wing has the function of supporting mechanical stresses associated with folding the wing, but also of withstanding mechanical stresses associated with the two lift propellers connected thereto. The fixed part can therefore be designed to provide the mechanical strength necessary for this dual function. Conversely, the other parts of the aircraft, relieved of these mechanical stresses, can be more freely designed. In particular, it is possible to limit the overall size and mass of the fuselage, while retaining accessible space inside it. Ultimately, concentrating mechanical stresses in the fixed parts of the wings makes it possible to obtain a more compact and more optimised structure by mass than if these stresses were distributed between different parts of the aircraft.

In addition, the positioning of the lift propellers relative to the fixed wing planes reduces impact, in terms of aerodynamic loads, of the propeller wake on the fixed wing planes and, in particular, on the wings of the main wing plane. Thus, the propellers do not add additional mechanical stresses on the fixed parts of the wings of the main wing plane.

In some embodiments, the control system is configured to increase the span when changing from low-speed flight to cruise flight, and to decrease the span when changing from cruise flight to low-speed flight. Thus, the span is greater in cruise flight than in low-speed flight. In particular, the span is maximum in cruise flight and minimum in low-speed flight.

By fixed wing, it is meant all the aircraft lifting surfaces that do not rotate. The wing is a so-called 'fixed' wing as opposed to so-called 'rotary' wings. Some parts of the fixed wing can nevertheless be movable so as to vary the span. A fixed wing plane can be a lifting surface of the pair of wings type (which can be joined above or at the bottom of the fuselage, or extend on either side of the fuselage), tail unit type or canard type.

In the present description, the longitudinal and lateral directions are parallel, respectively, to the longitudinal axis and lateral axis of the aircraft. The axes of the aircraft are imaginary lines which pass through the aircraft as follows:

the longitudinal axis, or roll axis, extends from the nose (front end) to the tail (rear end) of the aircraft, through the fuselage and passes through the centre of mass of the apparatus;

the lateral axis, or pitch axis, extends from one end of the main fixed wing plane to the other end of this plane, passing through the centre of mass of the apparatus;

the vertical axis, or yaw axis, passes through the centre of mass of the apparatus, from top to bottom, and is perpendicular to the other two axes.

The front and rear, as well as upstream and downstream, are defined relative to the direction of forward motion of the aircraft.

As previously indicated, the lift propellers are longitudinally separated by at least the magnitude of the chord of the fixed wing plane located therebetween and laterally by at least the width of the fuselage located therebetween. The chord is the imaginary line between the leading edge and the trailing edge of the wing plane. The chord of the fixed wing plane located between the propellers is the chord located in the vertical plane containing the axes of rotation of the propellers surrounding the wing plane. The width of the fuselage located between the propellers is the largest lateral dimension of the fuselage as measured in the vertical plane containing the axes of rotation of the propellers surrounding the fuselage. In some embodiments, the lift propellers are longitudinally separated by a distance of between 1.3 and 3 times said magnitude of the chord and/or laterally by a distance of between 1.3 and 3 times said width of the fuselage. The separation distance between two propellers is the distance between the closest ends of the propeller blades.

Such a separation between the lift propellers considerably reduces mixing of propeller wakes under the aircraft, especially in low-speed flight. In transition flight (changing from low-speed flight to cruise flight), the interaction of propeller/propeller wakes is greatly reduced due to the reduction in the aerodynamic load of the lift propellers obtained by virtue of the increasing contribution of the fixed wing planes to lift. In cruise flight, this interaction can be eliminated because the lift propellers can be stopped. In particular, in some embodiments, the aircraft control system is configured to rotate the lift propellers in low speed flight and to stop them during cruise flight.

As regards the impact of the wake of fixed wing planes on lift propellers, it is almost non-existent in low-speed flight, as fixed wing planes have little or no wake. The first effects are felt as the aircraft picks up speed, i.e. at the start of the transition phase, when changing from low-speed flight to cruising flight. During this transition phase, interaction of the fixed wing plane/propeller wakes is relatively weak due to the low lift of the fixed wing planes. Finally, in cruise flight, this interaction is non-existent because the propellers are stopped and only the fixed wing planes carry the weight of the aircraft.

By low-speed flight, it is meant either hovering (stationary, at zero or near-zero speed) or low-speed flight, i.e. flight at speeds below 56 km/h (30 knots). By cruising flight, it is meant a flight at speeds higher than the speed (so-called minimum cruising speed and noted Vc min) from which the lift created by the fixed wing entirely compensates for the weight of the aircraft.

The transition phase corresponds to the change from low-speed flight to cruising flight, and vice versa.

In some embodiments, the span of at least one of the fixed wing planes can vary between a maximum and minimum span, the minimum span being less than or equal to 50% and, more particularly, 40% of the maximum span. A minimum span equal to 50% of the maximum span corresponds to a minimum span half the size of the maximum span.

The span can be reduced to its minimum in low-speed flight. The aircraft then becomes more compact and has better wind resistance.

The main plane comprises a pair of wings and has a variable span. Each wing is foldable and the control system is configured to unfold each wing laterally along the lateral direction. The span is thus varied laterally, i.e. along the lateral axis of the aircraft. This avoids, in particular, having to pivot the wing in the horizontal plane and pass it over the lift propellers, which would create detrimental aerodynamic interactions.

Each wing has a movable part and a fixed part. The fixed part is the proximal or central part of the wing, connected to the fuselage. The movable part is the end part or distal part of the wing, i.e. the part furthest from the fuselage.

The wing is foldable in such a way that its movable end part comes to be positioned on (i.e. on top of) its fixed part upon folding. The wing is thus folded upwards, as compared to lateral or downward folding, as upward folding limits aerodynamic interactions with the propellers. Further, compared to a downward folding, the upward folding allows the wings to avoid touching the ground when the control system to vary the span is operated on the ground.

In some embodiments, the lift propellers comprise two blades and the control system is configured to stop the lift propellers in a stop position such that the blades are parallel to the longitudinal axis of the aircraft. When positioned in this way, the propeller blades are in the same direction as the fuselage, which reduces their aerodynamic drag when the aircraft is in cruise flight.

In some embodiments, the lift propellers are dual contra-rotating propellers. This type of propeller especially makes it possible to reduce diameter of the propeller rotors and thus improve compactness of the aircraft.

In some embodiments, some lift propellers can be changed over to become propulsive propellers. This makes it possible to limit the number of propellers on board the aircraft. In particular, the propellers can have a lift function during one flight phase, e.g. in low-speed flight, and a propulsion function during another flight phase, e.g. in cruise flight. This dual use of the lift propellers allows the aircraft to be more compact and lighter, as the number of propellers is reduced.

The aforementioned as well as other characteristics and advantages will become apparent upon reading the detailed description that follows. This detailed description refers to the appended drawings.

BRIEF DESCRIPTION OF THE DRAWINGS

The appended drawings are schematic and not necessarily drawn to scale; they are intended above all to illustrate the principles of the invention. In these drawings, from one figure (fig) to the next, identical elements (or parts of elements) are identified with the same reference signs.

FIG. 1 This figure represents an example of a VTOL aircraft seen in profile.

FIG. 2 This figure represents the example of a VTOL aircraft from [FIG. 1] seen from above, with its main fixed wing plane unfolded.

FIG. 3 This figure is a view similar to that in [FIG. 2], with the fixed wing plane folded back.

DETAILED DESCRIPTION

Specific embodiments of the aircraft provided are described in detail hereinafter, with reference to the example represented in the appended drawings. These embodiments illustrate the characteristics and advantages of the invention. However, it is reminded that the invention is not limited to these embodiments or to the example represented.

In general terms, the VTOL aircraft provided comprises a fuselage, at least one propulsion system, at least four lift propellers and at least two fixed wing planes. It may be a manned or unmanned aircraft, such as a drone.

In the example in the figures, VTOL aircraft 1 comprises a fuselage 2, a propulsion system 5, four lift propellers 10 and three fixed wing planes 20, 30, 40. The first fixed wing plane 20, the most forward of aircraft 1, is of the canard type. The second fixed wing plane 30 located in the middle part of aircraft 1 is the main wing plane. It is of the wing pair 32 type and consists, in the example, of a right wing and a left wing joined together above the fuselage 2. The third fixed wing plane 40 located behind the aircraft 1, referred to as the rear wing plane, is of the tail unit type.

The four lift propellers 10 are distributed on either side of the fixed wing plane 30 and on either side of the fuselage 2. In other words, two lift propellers 10 are located to the right of the fuselage, on either side (i.e. front and rear) of the right wing 32 and two lift propellers 10 are located to the left of the fuselage, on either side (i.e. front and rear) of the left wing 32.

The left lift propellers 10 (i.e. front left and rear left) are longitudinally separated by at least the magnitude of the chord $C1$ of the fixed wing plane 30 located therebetween. The right lift propellers (i.e. front right and rear right) 10 are longitudinally separated by at least the magnitude of the chord $C2$ of the fixed wing plane 30 located therebetween.

The axis of rotation of the propellers 10 is vertical. In the example, each lift propeller 10 is a dual contra-rotating propeller.

Along the longitudinal direction, the propellers 10 are arranged in two rows: a front row and a rear row. The rear wing plane 40 is located behind the rear row. The lift propellers 10 in the front row (i.e. front right and front left) are laterally separated by at least the width $L1$ of the fuselage 2 located therebetween. The lift propellers 10 in the rear row (i.e. rear right and rear left) are laterally separated by at least the width $L2$ of the fuselage 2 located therebetween.

The longitudinal axis X of the aircraft 1 is represented by the dotted line in FIGS. 1 and 2. The lateral axis Y, represented in [FIG. 2], is perpendicular to the longitudinal axis X and extends from one end of the main fixed wing plane 30 to the other, passing through the centre of mass G of the aircraft. The vertical axis Z, represented in [FIG. 1], is perpendicular to the axes X and Y and passes through the centre of mass G. The terms 'lower', 'upper', 'top', 'bottom', 'above' and 'below' refer to a difference in height along the vertical axis.

The fixed wing planes located behind the most forward propellers 10, namely wing planes 30 and 40, both located behind the front row of propellers 10, are located above the set of lift propellers 10, as illustrated in [FIG. 1]. This means that the lower faces (underwing section) of the fixed wing planes 30, 40 are all located at a higher height than the highest plane of rotation of propellers 10. In the example of

[FIG. 1], this means that H2>H1, where H2 is the height of the lowest lower face, and H1 is the height of the highest plane of rotation.

The fixed wing plane 30 has a variable span and the aircraft 1 comprises a control system, i.e. a set of on-board devices and mechanical, hydraulic and/or electrical connections, for varying the span of the wing plane 30 in flight. In the case of a VTOL drone, this control system can be controlled automatically and/or by remote control. In the case of a manned VTOL aircraft, this control system can be controlled automatically and/or manually from the cockpit. This control system is generally adapted to be controlled by the aircraft piloting laws, in order to adapt the span to the flight phase. In some embodiments, the control system is configured to increase the span when changing from low-speed flight to cruise flight, and to decrease the span when changing from cruise flight to low-speed flight. The aircraft can thus take off and land with the wings 32 at reduced span from a confined zone.

Each 32 wing is foldable, so as to position a movable end part 33 of the wing along and above a fixed part 31 of the wing. Any folding in an intermediate position (for example at right angles) should be avoided in order to avoid creating a wind load.

In the example in the figures, a movable end part 33 of each wing 32 is foldable along a folding line 34.

In [FIG. 2], the movable parts 33 are laterally unfolded and the span of the wings 32 is maximal. In [FIG. 3], the movable parts 33 are folded back and the span of the wings 32 is minimal. Each movable part 33 is folded back from above and is positioned along and above the fixed part 31.

In the example of the figures, the propulsion system 5 of the aircraft is a propulsion propeller mounted at the front end of the aircraft 1. Other propulsion systems 5 such as a fan, a turbojet engine, a jet engine or an array of 'small' propellers for distributed propulsion can be contemplated. These propulsion systems can be positioned above the lift propellers. In some embodiments, these propulsion systems are positioned on the highest fixed surface, to reduce interaction with the lift propellers, or are mounted to the wings 32 by means of an offset axis.

In some embodiments, each lift propeller 10 comprises two blades 12 (therefore four blades 12 in the case of a double propeller) and the control system is configured to, in cruise flight, stop the lift propellers 10 in a stop position such that the blades 12 are parallel to the longitudinal axis X of the aircraft to reduce their drag. For the same reasons, in some embodiments, the blades 12 can be disengaged relative to the rotor to position themselves one above the other to have a reduced aerodynamic impact in cruise flight.

An example of optimised operation of the VTOL aircraft provided, in different flight phases, is described hereinafter.
(1) Low-Speed Flight (Including Landing and Take-Off):
  VTOL aircraft 1 manoeuvres in this flight phase, orienting itself with lift propellers 10 having vertical axis. It can thus travel at up to 56 km/h (30 knots) with wings 32 folded. The aircraft thus demonstrates increased wind resistance capabilities due to a reduced span, by virtue of the foldable wings 32. The system of foldable wings 32 in low-speed flight ensures a minimal overall size during take-off and landing. For a same mass, during take-off and landing, most existing VTOL apparatuses have dimensions that are at least twice as large.
(2) Transition Phase:
  Changing from low-speed flight to cruising flight is achieved, after the wings 32 are unfolded, by virtue of the propulsion system 5. During the transition, the vertical axis lift propellers 10 remain in the horizontal plane of travel. This separation of the lift and propulsion members during the transition reduces the high power demand of the lift propellers 10. The positioning of the lift propellers 10 allows for a maximum reduction in aerodynamic surfaces. The propeller 10 interactions with fixed slipstream is largely cleared of the wings 32. Moreover, as the propellers 10 are positioned below the plane of the wings 32, the effect is further reduced.

(3) Cruising Flight:

In this flight phase, propellers 10 are stopped and blades 12 positioned along the fuselage 2 in order to reduce their drag. There is no interaction between the rotating and fixed surfaces.

The embodiments described in this description are given by way of illustrating and not limiting purposes, a person skilled in the art being able to easily, in view of this description, modify these embodiments, or contemplate others, while remaining within the scope of the invention.

In particular, a person skilled in the art will be able to easily contemplate alternatives comprising only some of the characteristics of the previously described embodiments, if these characteristics alone are sufficient to provide one of the advantages of the invention. In addition, the different characteristics of these embodiments can be used alone or be combined with each other. When combined, these characteristics may be combined as described above or in a different way, the invention not being limited to the specific combinations described in the present description. In particular, unless otherwise specified, a characteristic described in connection with one embodiment may be applied in a similar way to another embodiment.

The invention claimed is:

1. A vertical take-off and landing aircraft comprising:
a fuselage;
at least one propulsion system;
four lift propellers;
at least two fixed wing planes, including a main wing plane and a rear wing plane located behind the aircraft;
wherein:
the main wing plane and the rear wing plane are both located behind a most forward lift propellers of the lift propellors, and both are located above the lift propellers;

the main wing plane has a variable span and comprises a pair of wings, each wing being foldable along a lateral axis of the aircraft, such that a movable end part of each wing is positioned along and above a fixed part of the respective wing upon folding;
the aircraft comprises a control system for varying the span of the main wing plane in flight by unfolding each wing laterally;
the four lift propellers are distributed on either side of the main wing plane and on either side of the fuselage;
two of the lift propellers located on a same side of the fuselage are connected to the fixed part of the wing located on the same side of the fuselage and are longitudinally separated by at least a magnitude of a chord of the main wing plane located therebetween;
and two of the lift propellers located on a same side of the main wing plane are laterally separated by at least a width of the fuselage located therebetween.

2. The aircraft according to claim 1, wherein the control system is configured to rotate the lift propellers in low-speed flight and to stop them in cruise flight.

3. The aircraft according to claim 1, wherein the control system is configured to increase the span when changing from low-speed flight to cruise flight, and to decrease the span when changing from said cruise flight to said low-speed flight.

4. The aircraft according to claim 1, wherein the span can vary between a maximum span and a minimum span, the minimum span being less than or equal to 50% of the maximum span.

5. The aircraft according to claim 1, wherein the two lift propellers located on the same side of the fuselage are longitudinally separated by a distance of between 1.3 and 3 times said magnitude of the chord.

6. The aircraft according to claim 1, wherein the two lift propellers located on the same side of the main wing plane are laterally separated by a distance of between 1.3 and 3 times said width of the fuselage.

7. The aircraft according to claim 1, wherein the lift propellers each comprise two blades, the control system being configured to stop the lift propellers in a stop position such that the blades are parallel to a longitudinal axis of the aircraft.

* * * * *